United States Patent

He et al.

(10) Patent No.: US 8,531,610 B2
(45) Date of Patent: Sep. 10, 2013

(54) ARRANGEMENT AND APPROACH FOR IMAGE DATA PROCESSING

(75) Inventors: Haiyan He, Saratoga, CA (US); Johan Gerard Willem Maria Janssen, San Jose, CA (US); Erwin Ben Bellers, Fremont, CA (US); Franciscus Hendrikus Van Heesch, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 374 days.

(21) Appl. No.: 12/747,725

(22) PCT Filed: Dec. 26, 2008

(86) PCT No.: PCT/IB2008/055545
§ 371 (c)(1),
(2), (4) Date: Sep. 27, 2010

(87) PCT Pub. No.: WO2009/083926
PCT Pub. Date: Jul. 9, 2009

(65) Prior Publication Data
US 2011/0019095 A1    Jan. 27, 2011

(51) Int. Cl.
*H04N 5/21* (2006.01)
(52) U.S. Cl.
USPC .......................... 348/607; 348/624
(58) Field of Classification Search
USPC ............... 348/607, 624, 625, 630, 705, 706; 382/254, 255, 260–266, 273, 275
IPC ............................. H04N 5/21, 5/268
See application file for complete search history.

(56) References Cited

U.S. PATENT DOCUMENTS

| 6,810,082 B1 | 10/2004 | Shen et al. | |
| 2006/0274204 A1* | 12/2006 | Kimura et al. | 348/624 |
| 2007/0052860 A1* | 3/2007 | Matsubara et al. | 348/624 |
| 2010/0189373 A1* | 7/2010 | Ayzenberg | 382/266 |

FOREIGN PATENT DOCUMENTS

| JP | 2002351382 | 12/2002 |
| WO | 2007/088515 A1 | 8/2007 |
| WO | 2007/116370 A1 | 10/2007 |
| WO | 2008/018006 A2 | 2/2008 |

OTHER PUBLICATIONS

PCT Search Report mailed on Jul. 21, 2009 corresponding to the related PCT Patent Application No. IB2008/55545.
Chen, et al., "P-44: Smooth Frame Insertion Method for Motion-Blur Reduction in LCDs," EuroDisplay 2005, pp. 359-361.
Chen, et al, "Nonlinearity Compensated Smooth Frame Insertion for Motion-Blur Reduction in LCD," Multimedia Signal Processing, 2005 IEEE 7th Workshop, IEEE. P1, Oct. 1, 2005, pp. 1-4.

* cited by examiner

*Primary Examiner* — Sherrie Hsia
(74) *Attorney, Agent, or Firm* — Bruce Greenhaus; Richard Bachand; Duane Morris LLP

(57) ABSTRACT

Image data is processed to produce an output using a frame insertion approach. According to an example embodiment, frames are generated for video data, based upon the video data and the presence (or absence) of artifacts in the video data. In one application, a dynamic frame insertion approach is used to selectively generate peaked and blurred video frames in a manner that mitigates undesirable display and/or enhancement of artifacts by tuning down or turning off the generation and/or insertion of video frames.

18 Claims, 2 Drawing Sheets

ARRANGEMENT AND APPROACH FOR IMAGE DATA PROCESSING

Figure 1:
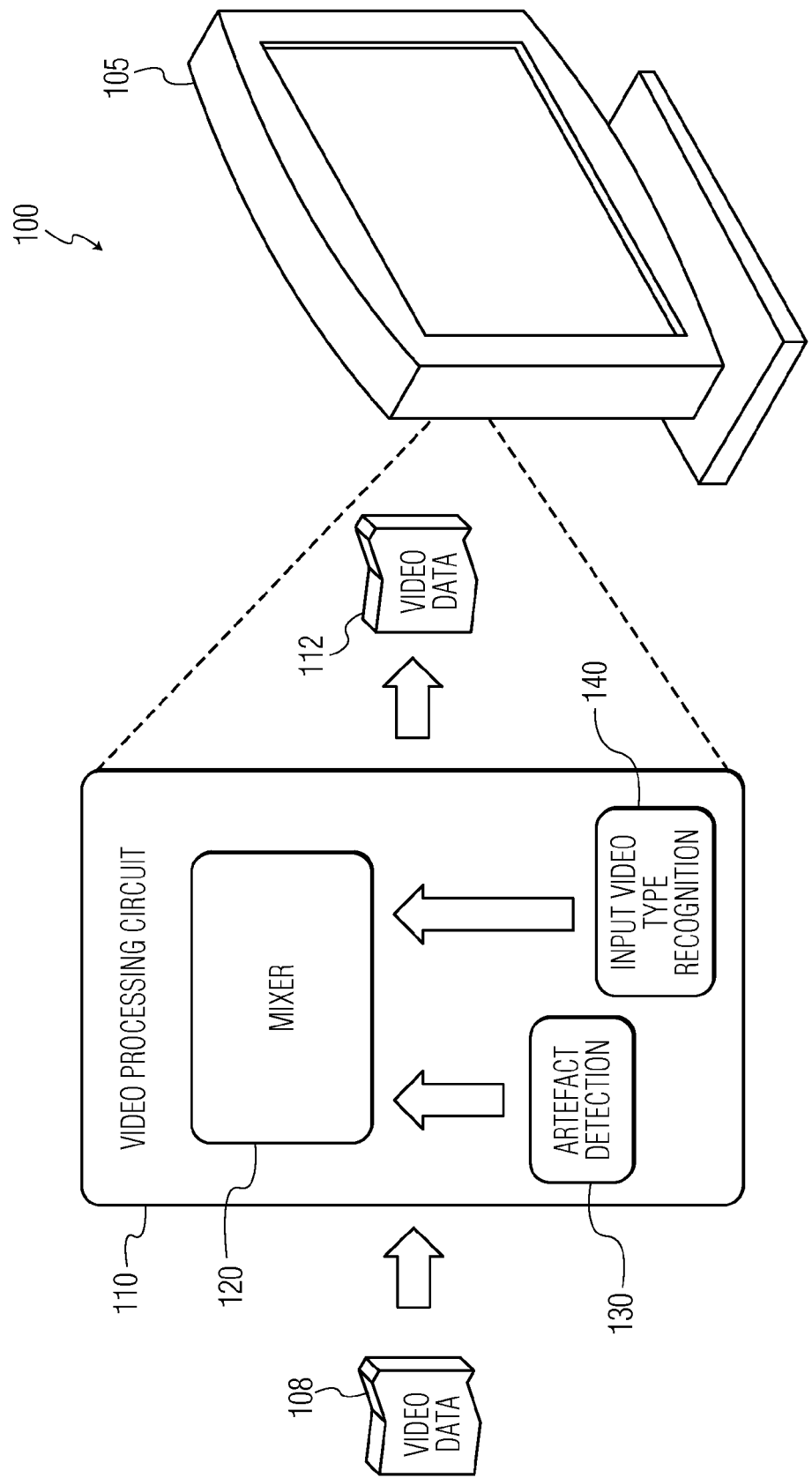

The present invention relates generally to image applications, and more specifically, to circuits and methods for processing image data for display.

Many image and video display devices are susceptible to undesirable characteristics that relate to the presentation of video such as motion pictures and, where appropriate, video images that are accurate and pleasing. For instance, liquid crystal display (LCD) displays have suffered from motion blur that can be caused by a relatively slow response time of liquid crystal material in the display, and the hold time of the picture being displayed.

With early LCD panels, motion blur was dominated by the slow reaction time of the LCD panels. With the developing of new liquid crystal (LC) material and related overdrive technology, the reaction time of LC has become much faster. For current LCD displays, motion blur is mainly caused by sample & hold characteristics of the LCD displays, which sample and hold each pixel value for one frame period.

When our (human) eyes track a moving object, the moving object is "still" on our retinas, and we see a sharp image. However, when our eyes track a moving object on a LCD panel, the object is stationary for a frame period. The perceived image is similar to the image of watching a moving object by fixed eyes. Therefore, the perceived image is blurred.

The above and other undesirable characteristics have become increasingly challenging to address as display sizes are increased, and further as the quality of video to be displayed is increased as well. For instance, while relatively small LCD displays have been used in applications such as laptop computers for some time, LCD displays are increasingly used for much larger displays for television or video viewing and higher quality images such as those in high-definition video. As display size and video quality are increased, conditions such as motion blur are more readily perceived by the human eye.

One approach to reducing motion blur involves reducing the hold time of the display, which can be achieved by increasing the refresh rate of the display. Various techniques have been used to generate extra frames for supporting a higher refresh rate, and have included black frame insertion, grey frame insertion and dynamic frame insertion (DFI). The latter of these, DFI, alternates peaked and blurred versions of each input picture that are obtained by spatial filtering. This effectively reduces the hold time of spatial details by a factor of two, while large areas have a hold time of the input frame rate for preventing large area flicker. However, DFI can make artefacts in images more pronounced or otherwise more visible.

While these approaches have been used with some success, improvement in display technology remains highly desirable, particularly as displays are increased in size and as image quality is increased as well. In this regard, blurring and other issues continue to present challenges to the implementation and processing of image data.

Various aspects of the present invention are directed to arrangements for and methods of processing image data in a manner that addresses and overcomes the above-mentioned issues and other issues as directly and indirectly addressed in the detailed description that follows.

In connection with various example embodiments, motion de-blur processing such as DFI is prevented or turned off for regions of an image or video frame having a high risk of high spatial frequency content-based artefacts. For instance, some artefacts introduced in a video processing chain (e.g., video encoder/decoder or frame rate upconverter) have the high spatial frequency characteristic. Motion blur processing helps to reduce this kind of artefact, and is thus used in a controlled manner for processing video data for image regions exhibiting high spatial frequency content artifacts.

According to another example embodiment of the present invention, a video processing circuit includes a filter circuit to filter incoming video data; an artefact detection circuit to detect artefacts in frames of the video data; and a mixing circuit generate and output video frames, using the incoming video data. For each input video frame in which an artefact is not detected, the mixing circuit generates and outputs successive peaked and blurred video frames using the input video frame and the filtered value of the input video frame. For each input video frame in which an artefact is detected, the mixing circuit generates and outputs successive video frames using the input video frame.

According to another example embodiment of the present invention, video data is processed as follows. A filtered value is generated for each input video frame in the video data, and artefacts are detected for each frame. For each input video frame in which an artefact is not detected, successive peaked and blurred video frames are generated and output using the input video frame and the filtered value of the input video frame. For each input video frame in which an artefact is detected, successive video frames are generated and output using the input video frame.

According to another example embodiment of the present invention, video data is processed as follows. For each input pixel having a value IN, the pixel value IN is filtered to generate a filtered pixel value LP. A mixing factor $\beta1$ is generated as a function of a color characteristic of the input pixel, and a mixing factor $\beta2$ is generated as a function of the presence of artefacts in the input pixel. A mixing factor $\beta$ is then generated from $\beta1$ and $\beta2$. Successive video frames are output for displaying the input pixel by generating and outputting a peaked video frame including a pixel having a value that is equal to $(1+\beta) \times IN - \beta \times LP$, and generating and outputting a blurred video frame including a pixel having a value that is equal to $(1-\beta) \times IN + \beta \times LP$.

The above summary of the present invention is not intended to describe each embodiment or every implementation of the present invention. Other aspects of the invention will become apparent and appreciated by referring to the following detailed description and claims taken in conjunction with the accompanying drawings.

Figure 2:
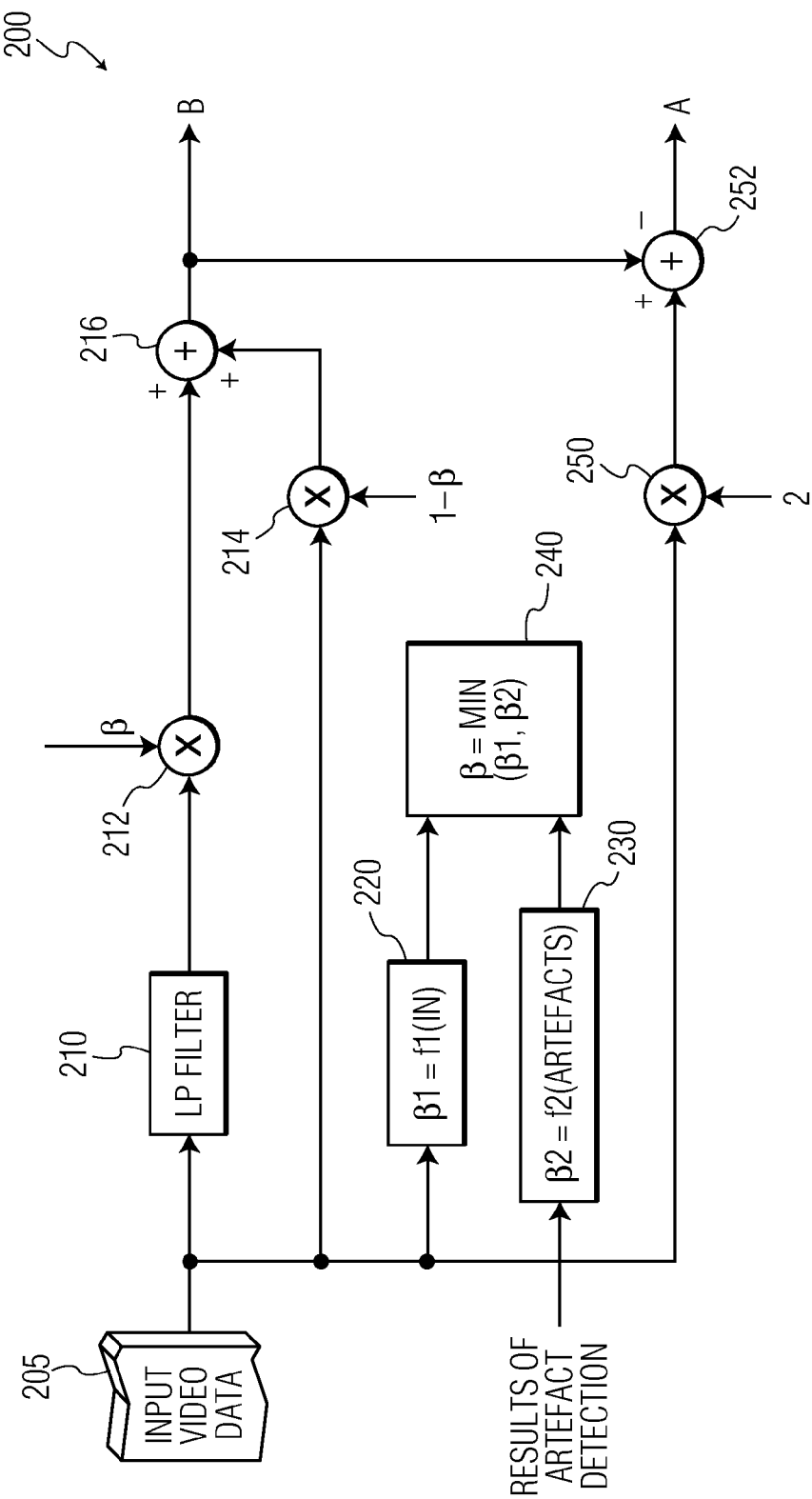

The invention may be more completely understood in consideration of the following detailed description of various embodiments of the invention in connection with the accompanying drawings, in which:

FIG. 1 shows an image display arrangement for processing images in a manner that mitigates the display of artefacts, according to an example embodiment of the present invention; and FIG. 2 shows a circuit for processing video data for generating alternating outputs for a display, according to another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of arrangements and approaches for image data processing. While the present invention is not necessarily limited to such applications, an appreciation of various aspects of the invention is best gained through a discussion of examples in such an environment.

According to an example embodiment of the present invention, video data is provided to a display using a selective dynamic frame insertion (DFI) approach. Depending upon the input type of video data, the data is processed using alternating peaked and blurred image data in output frames (DFI), or by providing the input video data for output (i.e., DFI is not implemented). This approach is applicable, for example, to turn off DFI for input video data that is near-black or near-white. Where DFI is implemented, the amount and/or degree of frame insertion is controlled in response to the presence of artefacts.

According to another example embodiment of the present invention, a DFI approach involving alternating between peaked and blurred outputs for a particular video stream involves generating the blurred output by mixing a low-pass filtered value with an input value of for each pixel. The mixing is controlled in response to the input value of the current pixel being processed such that the amount of difference between the peaked and blurred outputs for a particular pixel is less when artefacts are detected in the pixel position. With this approach, undesirable enhancement of artefacts is mitigated.

As may be implemented in connection with one or more example embodiments, peaked video frames are generated in a variety of manners. In many applications, peaking is a type of signal enhancement that is applied to an output video signal before the signal is displayed, and can be used to enhance high frequency edges to enhance the sharpness of a displayed image. For instance, peaked video frames can be generated by adding a video signal value to an input video signal, such as by adding a filtered value of a video frame to the original video frame from which the filtered value was obtained, or by adding some value related to such a filtered value to the original. Peaked video frames can also be generated by subtracting a blurred frame from an original input frame. Also as may be implemented in connection with one or more example embodiments, blurred video frames are generated by passing video data to product a blurred image, such as by passing less than all image data and/or by passing a low frequency range of video data. For general information regarding peaked video frames, and for specific information regarding approaches to which video frames may be generated in connection with one or more example embodiments, reference may be made to U.S. Pat. No. 6,810,082 assigned to Koninklijke Philips Electronics N.V. (Eindhoven, N L), which is fully incorporated herein by reference. In addition, for general information regarding video processing, and for specific information regarding the generation and use of peaked and blurred video frames such as with dynamic frame insertion, reference may be made to International Patent Publication No. WO 2007/088515 A1, entitled "Video Processing Device and Method of Processing Video Data" (having inventor/applicant Tichelaar et. al, c/o NXP Semiconductors), which is, together with the references cited therein, fully incorporated herein by reference.

Turning to the figures, FIG. 1 shows an image display arrangement 100 for processing images in a manner that mitigates the display of artefacts, according to another example embodiment of the present invention. The arrangement 100 includes a video display 105 and a video processing circuit 110 that uses input video data 108 to generate output video data 112 for display. The video processing circuit 110 includes a mixer 120 that generates the output video data 112 from the input video data 108 using a selective video frame generation approach that is responsive to artefacts in the input video data and image characteristics of the video data.

To facilitate the mixing, an artefact detection circuit 130 detects artefacts in the incoming video data 108 and generates an output (e.g., an artefact map) to signal the detection of artefacts to the mixer 120. Artefacts are detected, for example, by detecting frequency, amplitude or other signal characteristics of the video data, or using a video decoder and/or some post-processing block to generate an artefact map. A video type recognition circuit 140 detects image characteristics of the video data 108, such as those relating to color, and generates an output to identify the image characteristics. For instance, certain types of video (e.g., certain pixels) are susceptible to undesirable processing characteristics, such as those relating to the display of near-black or near-white video. For these types, the video type recognition circuit 140 provides an output that informs the mixer 120 of the video type or otherwise communicates information that the mixer uses in generating the output video data 112.

The arrangement 100 generates video frames in response to artefacts in different manners, depending upon the application. In one application, mixer 120 generates and sends successive video frames to the display 105 by dynamically inserting frames into a video stream provided to the display. When the artefact detection circuit 130 generates an artefact map that corresponds to each pixel in a particular input frame of the input video data 108, the mixer generates a blurred frame and a peaked from the particular input frame. In some instances, this dynamic insertion is carried out on a pixel-by-pixel basis, with different pixels in the image controlled independently from one another for each frame, relative to the type of image data (e.g., blurred or peaked) data inserted into each frame for pixels bearing artefacts as specified, for example, by the generated artefact map.

FIG. 2 shows a video circuit 200 for processing video data for generating alternating peaked (at A) and blurred (at B) video frames for a display using a mixing factor denoted as β, according to another example embodiment of the present invention. Peaked and blurred video frames are selectively output at A and B respectively according to characteristics of input video data 205.

The video circuit 200 includes a low pass filter circuit 210 that generates a filtered output from input video frames 205, and provides the filtered output to a multiplier circuit 212. Generally, the low pass filter circuit 210 separates the low-frequency components from the high-frequency components of incoming video, using a cutoff frequency to set the frequency characteristics of the separated components (i.e., high-frequency components are those which are at or above the cutoff frequency). The video circuit 200 also includes video mixing factor generators 220 and 230, which respectively generate mixing factors β1 and β2. For each input pixel in each video frame, mixing factor β1 is generated according to characteristics of the input pixel, and mixing factor β2 is generated according to the results of artefact detection on the input pixel. Each pixel in every video frame is processed in this manner.

Various pixel characteristics and artefact detection approaches may be used to generate the mixing factors for different applications. Mixing factor β1 is set according to the type of video to be displayed for a particular video frame (or pixel in the frame). In this regard, β1 is set to zero (0) under input video conditions for which frame insertion is undesirable, and β1 is set to one (1) under input video conditions amenable to frame insertion. For instance, with certain liquid crystal display (LCD) video displays, the use of a frame insertion approach such as DFI can result in undesirable artefacts for near-black and near-white input frames (or portions of frames as such). When a video stream is to be displayed with such an LCD video display, β1 is set to zero (0) for near-black or near-white frames, frame regions and/or pixels in the stream that are not amenable to frame insertion, while β1 is set to one (1) for the other video frames in the stream. Other types of video can be processed using a similar approach, when the video exhibits conditions such as color types or other conditions for which frame insertion is undesirable.

Using a similar approach, β2 is set in response to the presence (or absence) of artefacts in the input video. For instance, in a particular implementation, β2 is set to zero (0) when an input video frame or pixel in the frame exhibits an artefact. Where artefacts are not present in the input video frame or pixel, β2 is set to one (1). This approach is carried out on a frame or pixel basis to effect the display of video in a manner that is pleasing to the human eye.

Mixing factor generator 240 generates the mixing factor β that is used in generating the peaked and blurred video frames, using β1 and β2. This mixing factor β is used at multiplier circuits 212 and 214 in accordance with the following equations depicting the peaked and blurred video frames that are output for each input video frame:

$$A = (1+\beta) \times IN - \beta \times LP, \quad \text{(Equation 1)}$$

$$B = (1-\beta) \times IN + \beta \times LP \quad \text{(Equation 2)}$$

where
A is the peaked output frame,
B is the blurred output frame,
IN is the input video frame,
LP is the filtered video frame from the low-pass filter 210, and
β is the minimum of β1 and β2 as described above (i.e., β=min(β1, β2)).

In consideration of equations 1 and 2 above, when β=1, the blurred output frames are the output from the low-pass filter circuit 210 (i.e., B=LP), and the peaked output frames are the value of twice the input video frame, less the output from the low-pass filter circuit (i.e., A=2×IN−LP). When β=0, the peaked and blurred output frames are both at the value of the input video frame, such that frame insertion is effectively not carried out.

In some applications, the circuit 200 is controlled to facilitate the display of video frames exhibiting motion blur. For example, where video is displayed using an LCD display, motion blur can be used to mask or otherwise make artefacts less discernable to the human eye. In this context, a selective frame insertion approach involves the display of incoming video frames in a manner that allows motion blur under conditions susceptible to artefacts, and mitigates motion blur when artefacts are not present. For instance, a dynamic frame insertion (DFI) approach can be implemented using the above Equations 1 and 2 to mitigate motion blur under conditions where artefacts are not detected, and to otherwise operate to present video frames without an insertion approach.

Referring to Equations 1 and 2 above and/or the figures and their corresponding description, certain embodiments employ similar approaches with slightly or significantly different equations to generate output video frames in accordance with the present invention. For instance, a certain approach to generating a peaked and/or blurred video frame involves using a high pass filter instead of or in addition to a low pass filter, with a cutoff frequency that is set in a manner similar to that described above with a low pass filter. Referring to Equation 1, such an approach can be used with a peaked video frame output generated by adding the input signal with the value of the mixing factor β multiplied by the output from a high pass filter. In another approach to generating peaked and/or blurred video frames, β is set as a function of β1 and β2 to facilitate the output of peaked and blurred video frames for a particular input video frame, where the difference in value between the peaked and blurred frames is reduced, relative to the above approaches. Still other approaches involve using parts or fractions of the respective mixing factors β1 and β2, or of the mixing factor β as implemented in Equations 1 and 2, when generating peaked and blurred frames relative to the detection of artefacts in an input frame.

In still other embodiments, one or both of the input-based mixing factor β1 and the artefact-based mixing factor β2 are set to values other than zero or one as described above. For instance, the artefact-based mixing factor (β2 can be set to 1 when no artefacts are present, and to 0.5 when artefacts are present. In this regard, when a dynamic frame insertion (DFI) approach is carried out (e.g., when (β1=1); peaked and blurred outputs as generated via Equations 1 and 2 are generated using β1=0.5 and thus having a difference that is reduced, relative to the outputs generated when β=1.

The display approaches and embodiments described herein are amenable to use with a multitude of different types of display systems and arrangements, and can be arranged and/or programmed into a variety of different circuits and controllers. For example, certain embodiments involve processing approaches that are carried out in a video processing circuit pipeline for video or television (TV) systems. One such embodiment involves the implementation of one or more of the above frame insertion approaches with a backend video scaler integrated circuit, such as those used on the signal board of an LCD display or television. Another embodiment involves the implementation of one or more of the above frame insertion approaches with a timing controller circuit, such as those used on the panel of a LCD display for controlling the sequencing and timing of image signals.

The output from the multiplier circuit 212 is added to the output of the multiplier circuit 214 by and adder 216. The output of the adder 216 provides the blurred output, B. The input video data is multiplied by a factor of two by multiplier 250. The blurred output, B, is subtracted from the output of the multiplier 250 by an adder 252 to provide the peaked output, A.

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays).

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, various image data processing approaches may be amenable to use with various display types, relating to projection displays, flat-panel displays, LCD displays (including those described) involving flat-panel or projection, and other digital light processing display approaches. Such modifications and changes do not depart from the true scope of the present invention that is set forth in the following claims.

What is claimed is:

1. A video processing circuit including
a filter circuit to filter incoming video data;
an artefact detection circuit to detect artefacts in frames of the video data; and
a mixing circuit to
for each input video frame in which an artefact is not detected, generate and output successive peaked and blurred video frames using the input video frame and the filtered value of the input video frame, and
for each input video frame in which an artefact is detected, generate and output successive video frames using the input video frame.

2. The circuit of claim 1, wherein the mixing circuit generates and outputs successive video frames using the input video frame, for each input video frame in which an artefact is detected, by outputting successive video frames having the value of the input video frame.

3. The circuit of claim 1, wherein the mixing circuit generates and outputs successive video frames using the input video frame, for each input video frame in which an artefact is detected, by outputting successive video frames having a difference that is greater than zero.

4. The circuit of claim 1, wherein the mixing circuit generates and outputs successive peaked and blurred video frames by generating a peaked video frame having a value that is the value of the input video frame plus a filtered value of the input video frame.

5. The circuit of claim 1, wherein the mixing circuit generates and outputs successive peaked and blurred video frames by generating a blurred video frame having a value that is the filtered value.

6. The circuit of claim 1, wherein the mixing circuit generates and outputs successive peaked and blurred video frames by
generating a peaked video frame having a value that is the value of the input video frame plus a filtered value of the input video frame, and
generating a blurred video frame having a value that is the filtered value.

7. The circuit of claim 1, wherein the mixing circuit generates and outputs successive peaked and blurred video frames by generating and outputting successive peaked and blurred video frames in response to a color characteristic of the video frame.

8. The circuit of claim 1, wherein
the filter circuit filters incoming video frame data by filtering each pixel in the input video frame,
the artefact detection circuit detects artefacts in frames of the video data by detecting artefacts for pixels in each video frame,
the mixing circuit generates and outputs successive peaked and blurred video frames using the input video frame and the filtered value of the input video frame by generating and outputting successive peaked and blurred video frames for each pixel using the input pixel and the filtered value of the input pixel, and
the mixing circuit generates and outputs successive video frames using the input video frame by generating and outputting successive pixels using the input pixel.

9. A system for processing video data, the system comprising:
means for generating a filtered value for each input video frame;
means for detecting artefacts in frames of the video data;
means, for each input video frame in which an artefact is not detected, for generating and outputting successive peaked and blurred video frames using the input video frame and the filtered value of the input video frame; and
means, for each input video frame in which an artefact is detected, for generating and outputting successive video frames using the input video frame.

10. A method for processing video data, the method comprising:
generating a filtered value for each input video frame;
detecting artefacts in frames of the video data;
for each input video frame in which an artefact is not detected, generating and outputting successive peaked and blurred video frames using the input video frame and the filtered value of the input video frame; and
for each input video frame in which an artefact is detected, generating and outputting successive video frames using the input video frame.

11. The method of claim 10, wherein generating and outputting successive video frames using the input video frame, for each input video frame in which an artefact is detected, includes outputting successive video frames having the value of the input video frame.

12. The method of claim 10, wherein generating and outputting successive video frames using the input video frame, for each input video frame in which an artefact is detected, includes outputting successive video frames having a difference that is greater than zero.

13. The method of claim 10, wherein generating and outputting successive peaked and blurred video frames includes generating a peaked video frame having a value that is the value of the input video frame plus a filtered value of the input video frame.

14. The method of claim 10, wherein generating and outputting successive peaked and blurred video frames includes generating a blurred video frame having a value that is the filtered value.

15. The method of claim 10, wherein generating and outputting successive peaked and blurred video frames includes
generating a peaked video frame having a value that is the value of the input video frame plus a filtered value of the input video frame, and
generating a blurred video frame having a value that is the filtered value.

16. The method of claim 10, wherein generating and outputting successive peaked and blurred video frames includes generating and outputting successive peaked and blurred video frames in response to a color characteristic of the video frame.

17. The method of claim 10, wherein
generating a filtered value for each input video frame includes generating a filtered value for each pixel in the input video frame,
detecting artefacts in frames of the video data includes detecting artefacts for pixels in each video frame,
generating and outputting successive peaked and blurred video frames using the input video frame and the filtered value of the input video frame includes generating and outputting successive peaked and blurred video frames for each pixel using the input pixel and the filtered value of the input pixel, and
generating and outputting successive video frames using the input video frame includes generating and outputting successive pixels using the input pixel.

18. A method for processing video data, the method comprising, for each input pixel having a value IN:

filtering the pixel value IN to generate a filtered pixel value LP;

generating a mixing factor $\beta 1$ as a function of a color characteristic of the input pixel, generating a mixing factor $\beta 2$ as a function of the presence of artefacts in the input pixel;

generating a mixing factor $\beta$ from $\beta 1$ and $\beta 2$; and outputting successive video frames for displaying the input pixel by generating and outputting a peaked video frame including a pixel having a value that is equal to $(1+\beta) \times IN - \beta \times LP$, and generating and outputting a blurred video frame including a pixel having a value that is equal to $(1-\beta) \times IN + \beta \times LP$.

* * * * *